Sept. 21, 1937.  G. R. WOOD  2,093,533
RECORDER
Filed March 17, 1934  7 Sheets-Sheet 1
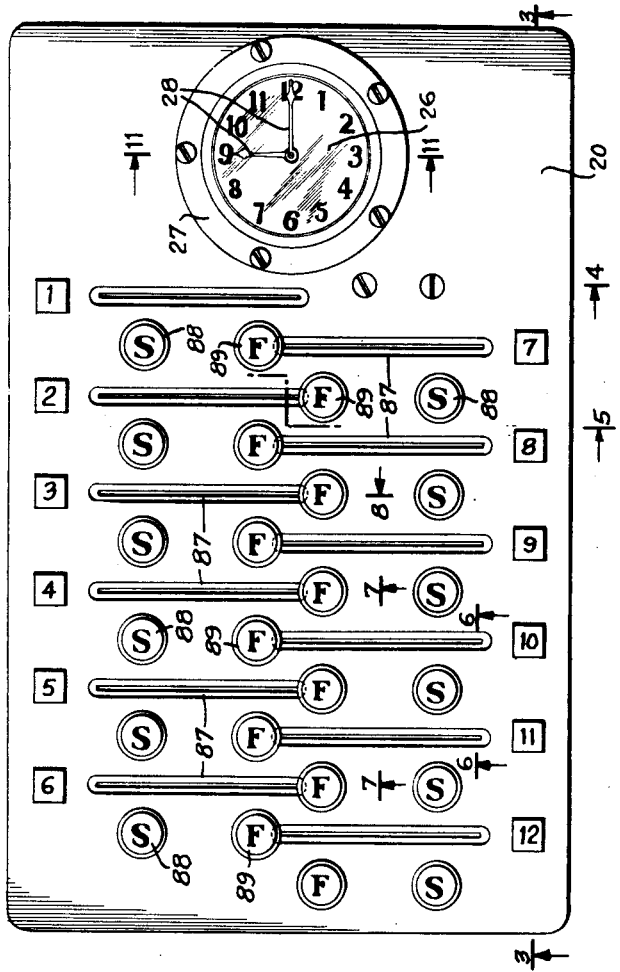
FIG.1.
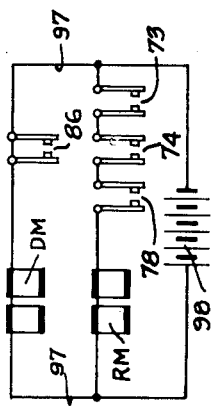
FIG.16.
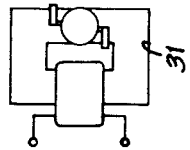
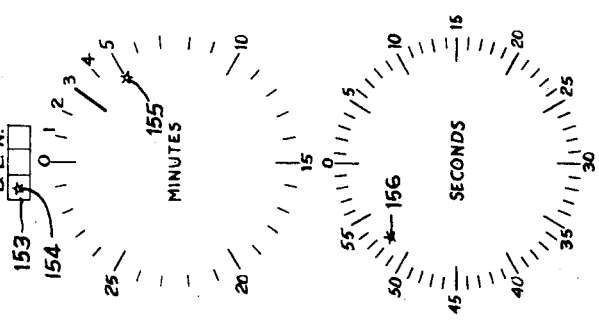
FIG.2.
INVENTOR
George R. Wood
BY
ATTORNEY Sept. 21, 1937.  G. R. WOOD  2,093,533
RECORDER
Filed March 17, 1934  7 Sheets-Sheet 3

INVENTOR
George R. Wood
BY
ATTORNEY

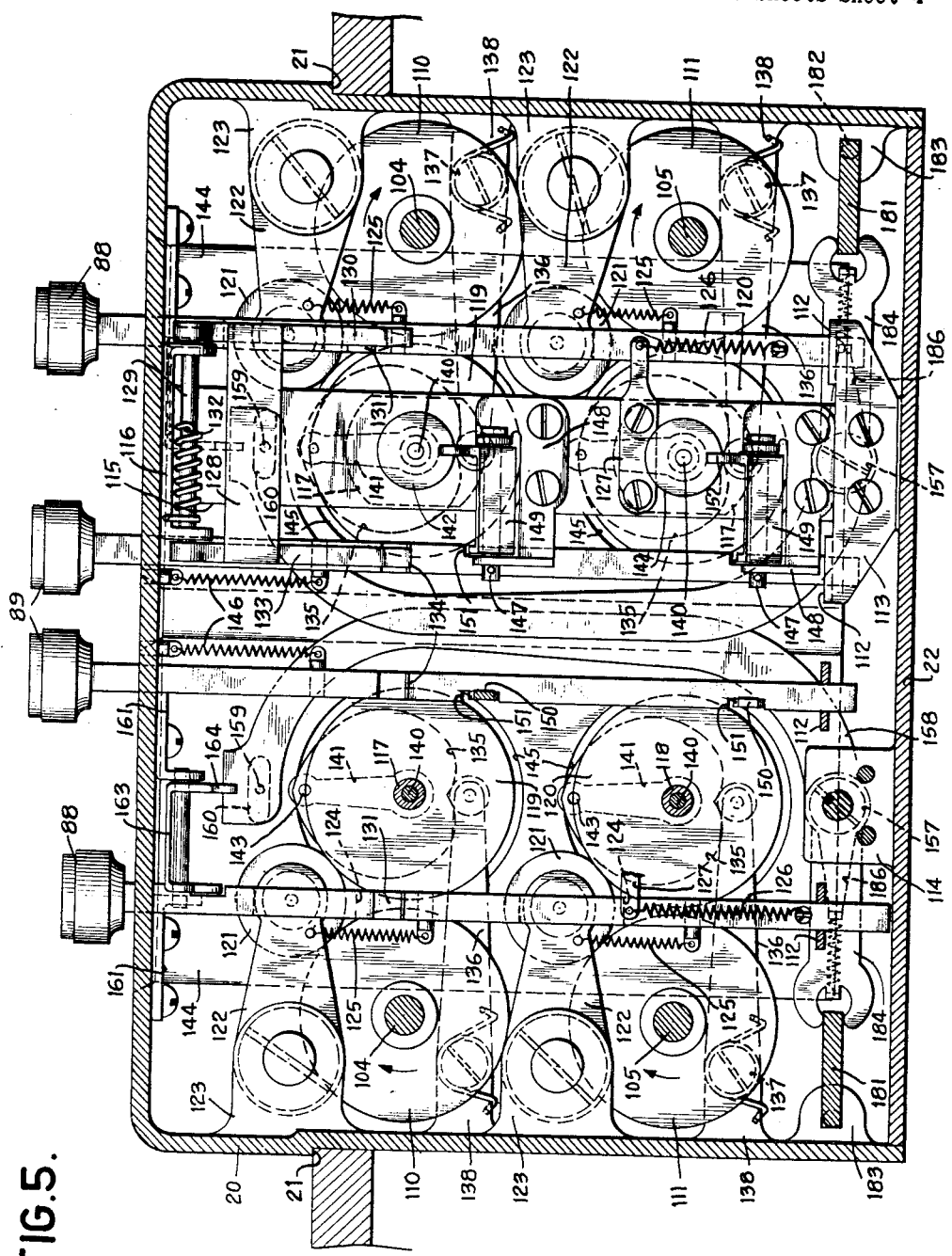

Sept. 21, 1937.   G. R. WOOD   2,093,533
RECORDER
Filed March 17, 1934   7 Sheets-Sheet 5
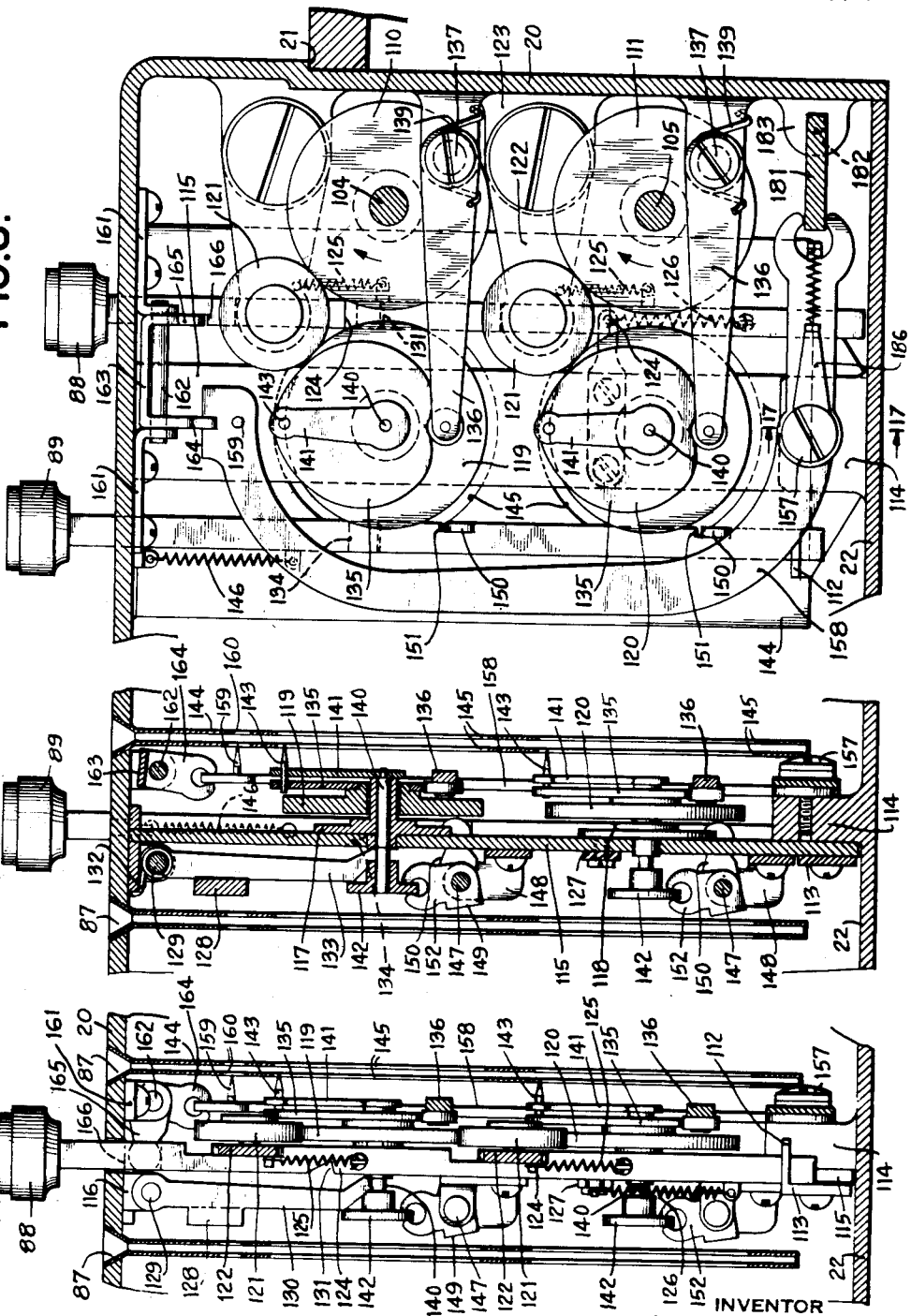

Sept. 21, 1937.     G. R. WOOD     2,093,533
RECORDER
Filed March 17, 1934     7 Sheets-Sheet 6
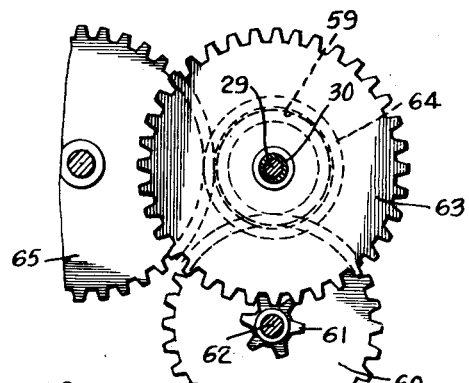
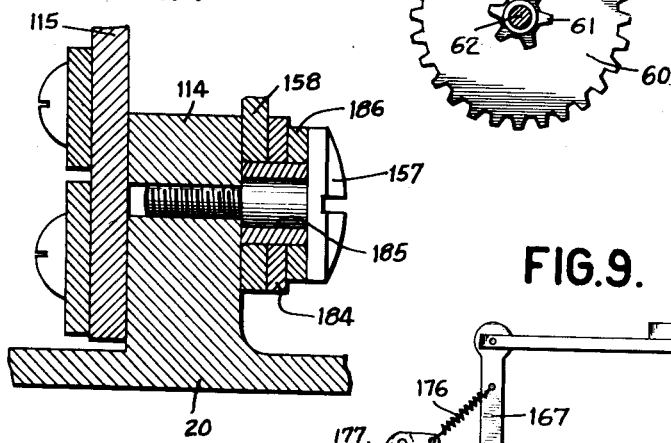
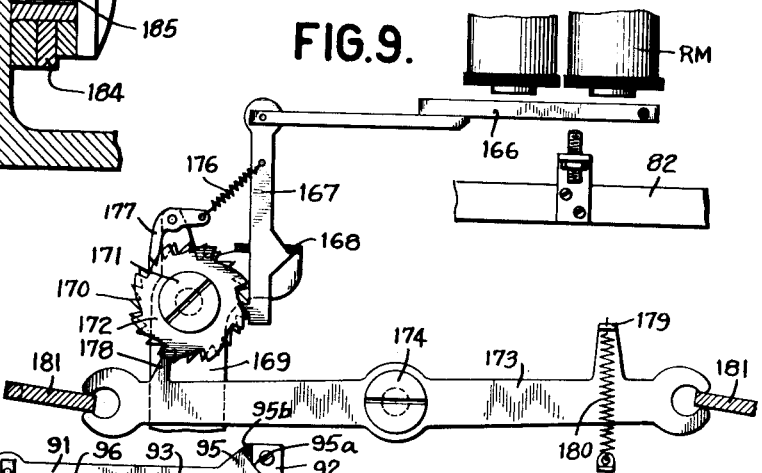
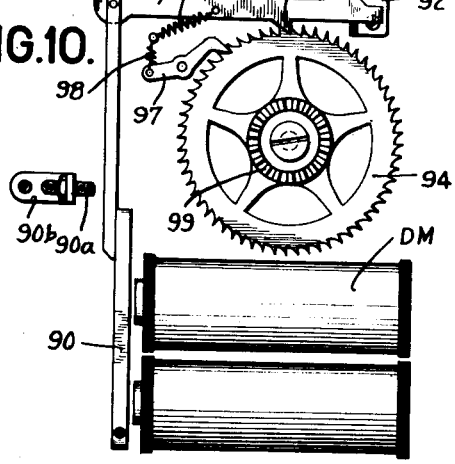

Sept. 21, 1937.　　　　　G. R. WOOD　　　　　2,093,533
RECORDER
Filed March 17, 1934　　　7 Sheets-Sheet 7
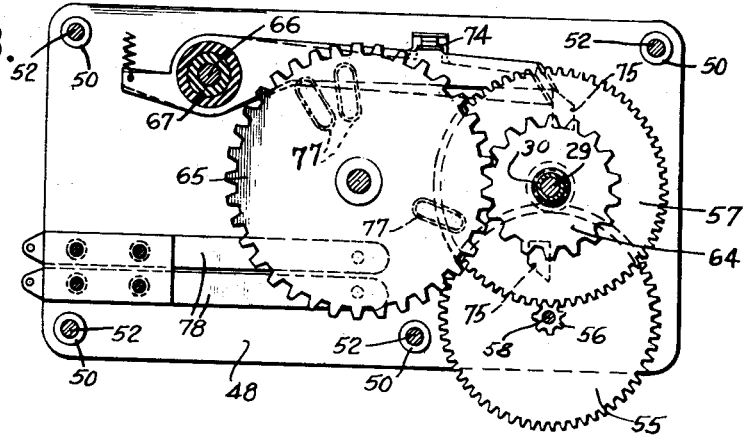
INVENTOR
George R. Wood
BY
ATTORNEY Patented Sept. 21, 1937

2,093,533

UNITED STATES PATENT OFFICE 2,093,533

RECORDER

George R. Wood, Toronto, Ontario, Canada, assignor to International Business Machines Corporation, New York, N. Y., a corporation of New York Application March 17, 1934, Serial No. 716,028

14 Claims. (Cl. 234—54)

This invention relates to time recorders in general.

The broad object of the present invention is to provide a novel time measuring and recording device which is capable of general use but is also admirably adapted for use in recording on suitable record media the time spent on telephone toll calls.

Charges for telephone calls are based principally on three things; the distance between the two subscribers' stations involved, the length of time required for the call to be completed, and the time of day when the call is made. It is customary to allow a period of three minutes to complete the call, for which period a charge is made which is based on the distance apart of the stations or exchanges involved and if this time is exceeded an additional charge is made for the additional predetermined periods of time needed to complete the call. It has been the custom of the telephone companies to charge less for calls made during certain parts of the day or night, when the lines are less active, than at times when the lines are very busy. Thus, a common practice is to charge full rates during the day, say from 4:30 a. m. to 7:00 p. m., while from 7:00 p. m. to 8:30 p. m. and from 8:30 p. m., to 4:30 a. m., respectively, still lower rates are in effect, the rates during the last named period being the lowest of all.

The accurate determination of the time consumed by toll calls is a very annoying and troublesome problem for the telephone companies. The operators usually are kept very busy making connections for subscribers, particularly, in exchanges serving business districts, and it is difficult for them to keep in mind the starting and stopping times of a dozen calls being made simultaneously besides performing necessary routine clerical work such as noting down for each call the numbers of the station calling and the station called.

Much of this clerical work must be done with one hand while the operator is using the other in establishing a connection for a subscriber. Mistakes frequently occur with the result that the bills are made out incorrectly and the subscriber is either overcharged or undercharged. In the former case disputes arise between the subscriber and telephone company and much bad feeling is produced while in the latter case there is a loss of revenue by the telephone company.

Conventional time stamps have been used for recording the starting and finishing time of toll calls but are not a complete solution of the problem as it is still possible for the operator to confuse the starting and finish times of two calls.

One of the objects of the invention is to provide a telephone toll recorder which is extremely simple of construction and operation and requires little of the operator's attention, which, in fact, can be operated by touch.

Another object of the invention is to provide a telephone toll recorder which reduces to a minimum the amount of clerical work required of an operator.

A further object is to provide a telephone toll recorder which is capable of accurately measuring and recording the periods of time required to complete several simultaneous calls none of which may have been started or finished together.

Another object is to provide a telephone toll recorder which is capable of indicating the rate which is to be used in billing the subscriber for the call.

A specific object is to provide a telephone toll recorder of large capacity wherein the various mechanisms are power driven under control of a low powered timing device or clock.

Another specific object is to provide a telephone toll recorder wherein the use of ink or inking devices is avoided.

A further specific object is to provide a telephone toll recorder which records the time required for each call on a suitable card or other record media individual to that call.

Still another object is to provide means for locking the card or other record media in the recorder until the time required to make the call has been recorded.

Other specific objects are to provide a telephone toll recorder which is simple and compact in construction, completely self-contained, cheap to manufacture, and has a large capacity for measuring and recording the time required for calls to be made.

Various other objects, advantages and features of the invention will be specifically mentioned in the following description and claims or will be apparent from a study of said description, the claims, and the accompanying drawings.

In the drawings:

Fig. 1 is a top plan view of the recorder.

Fig. 2 is a view of a form of record sheet adapted for use with the present invention.

Figure 4:
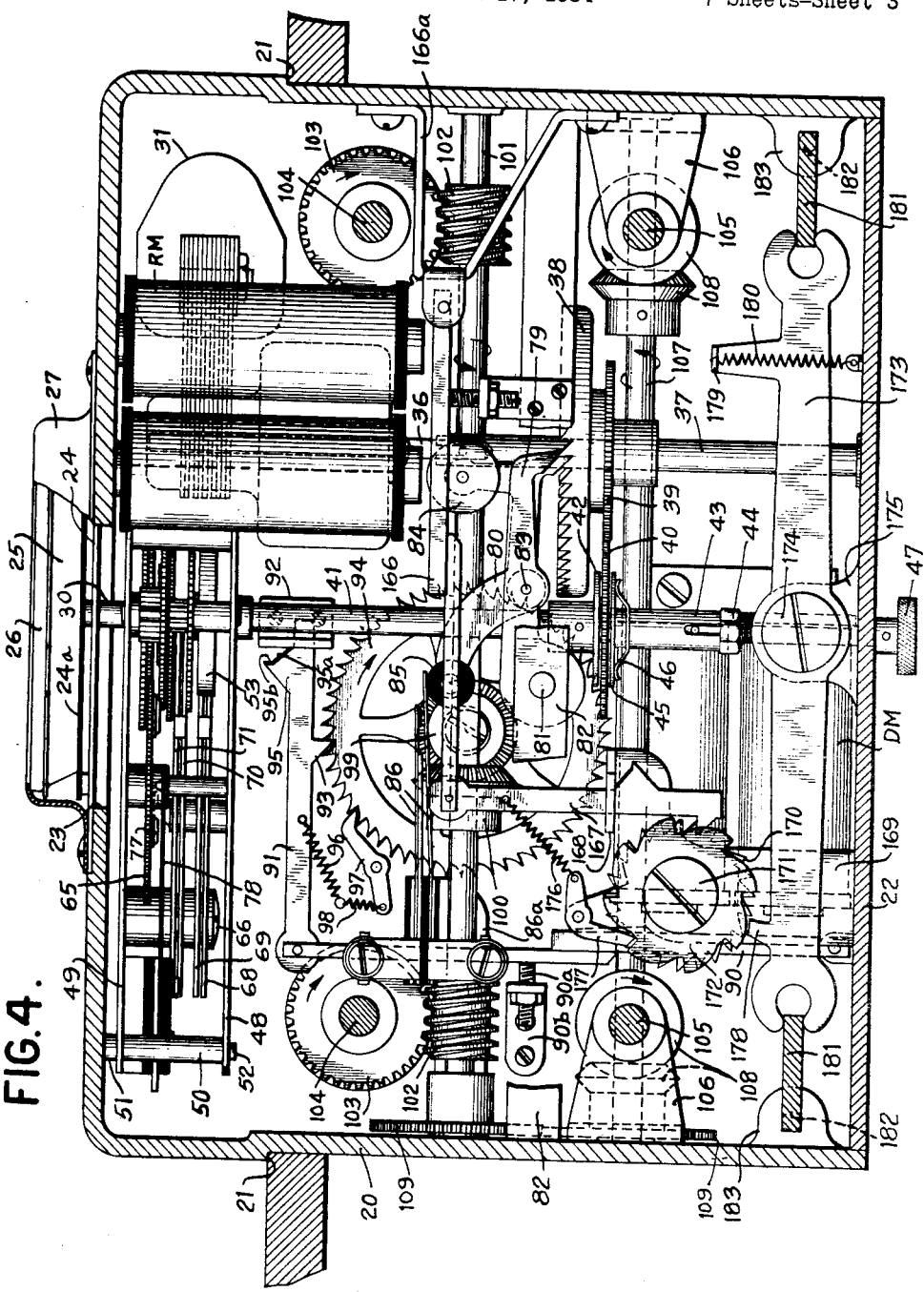

Figs. 4 and 5 are vertical transverse sections on the lines 4—4 and 5—5 in Fig. 1.

Figs. 6 and 7 are vertical longitudinal sections on the lines 6—6 and 7—7 in Fig. 1.

Fig. 8 is a vertical transverse section on line 8—8 in Fig. 1.

Fig. 9 is a detail view in elevation of the mechanism for controlling the recording of the rate by the recording units.

Fig. 10 is a detail view in elevation of the driving means for the recording units.

Fig. 11 is a detail vertical transverse section on the line 11—11 in Fig. 1.

Figs. 12, 13, 14, and 15 are horizontal sections on the lines 12—12, 13—13, 14—14, and 15—15, respectively, in Fig. 11.

Fig. 16 is a diagram of the electrical connections.

Fig. 17 is a vertical section on the line 17—17 of Fig. 8.

The recorder is contained in a suitable casing or housing 20 which may also serve to support part of the mechanism. As shown in Fig. 5, the housing 20 is provided with a shoulder 21 adapted to support the recorder in a suitably shaped aperture in the switchboard. Conveniently the recorder can be mounted adjacent the rows of plugs for the cord circuits of the switchboard. The housing 20 is closed at the bottom by a base plate 22 secured to said housing and adapted to support part of the mechanism. A circular opening 23 (Figs. 4 and 11) in the top of the housing 20 is closed by a disk 24 which is part of the framework of the clock unit to be described in detail later. The disk 24 supports a plate 24a which in turn supports a clock dial 25 protected by a glass 26, the glass being held in place by a bezel 27 secured to casing 20 by the same screws securing plate 24. The clock dial 25 is slightly dished to provide room for the clock hands 28 to turn. The latter are mounted in the usual fashion, that is, the minutes hand is secured to the minutes arbor 29 surrounded by an hour sleeve 30 to which sleeve is secured the hour hand, both the sleeve and arbor projecting through suitable holes in disk 24, plate 24a, and dial 25.

The driving train for the minutes arbor 29 and hour sleeve 30 is best illustrated in Figs. 3, 4, 11, 12, and 13. The recorder is timed by an electric motor 31 which may be of the well-known alternating current, synchronous type now very commonly used in electric clocks and timing devices of different kinds. The motor 31 is mounted on the underside of the top face of the casing 20 by means of screws 32 (Fig. 3) which pass through sleeves 33 and the pole pieces of the motor 31 and are threaded into posts 34. Secured to the posts 34 is a plate 35 which has a bearing for a shaft 36 geared to motor 31. The gearing (not shown) is such that this shaft rotates constantly at a speed of one revolution per minute.

The shaft 36 is socketed in a vertical shaft 37 having a pin and slot connection to shaft 36. The lower end of shaft 37 is journaled in base plate 22 and carries a ratchet wheel 38 (Figs. 3 and 4) and a gear 39. The latter meshes with a gear 40 loosely mounted on a second vertical shaft 41 parallel with shaft 37. Adjacent gear 40 is a friction disk 42 integral with a hub secured to shaft 41. On the side of gear 40 opposite to the friction disk 42 is a sleeve 43 slidably mounted on shaft 41 but having a pin and slot connection to the shaft 41 to permit said sleeve to slide on said shaft without slipping. The lower end of sleeve 43 abuts an adjusting nut 44 threaded on a shoulder formed in shaft 41. Interposed between the gear 40 and the upper end of sleeve 43 is a washer or disk 45 and a double box spring 46. By suitably adjusting nut 44 sufficient friction can be produced between disk 42 and gear 40 to cause the shaft 41 to be driven by gears 39, 40 when the motor 31 is receiving current.

The lower end of shaft 41 is journaled in base plate 22 and carries a knurled knob 47 by means of which shaft 41 can be rotated manually to set the hands 28 of the clock of which the gearing 39, 40 may be considered part of the time train.

The upper end of shaft 41 is journaled in the lower frame plate 48 of two spaced frame plates 48, 49 (Figs. 4 and 11) carrying certain gearing forming part of the time train and dial works of the clock. The plates 48, 49 are spaced from each other and the underside of the top face of housing 20 by means of sleeves 50, 51 through which plates and sleeves pass screws 52 suspending said plates from the housing 20. Secured to the upper end of shaft 41 above frame 48 is a cam 53 of fabricized composition like Bakelite, for instance, and a pinion 54 which may be of metal.

The ratio of the gears 39, 40 is unity, therefore, it is obvious that shaft 41, cam 53, and pinion 54 will all rotate at the rate of one revolution per minute.

The pinion 54 meshes with a gear 55 (Fig. 13) secured to a pinion 56 which in turn meshes with a gear 57, also of Bakelite or similar material, secured to the minutes arbor 29, the latter being journaled in a socket in the end of shaft 41. The gear 55 and pinion 56 are carried by a stud 58 secured to plate 48 and the ratio of the train of gearing comprising pinions 54, 56 and gears 55, 57 is such that minutes arbor 29 makes one revolution per hour. Secured to gear 57 is a smaller gear 59 which meshes with a larger gear 60 (Fig. 12) to which is secured a long pinion 61, gear 60 and pinion 61 being journaled on a stud 62 suspended from the plate 49. The pinion 61 meshes with a large gear 63 (Figs. 11 and 12) secured to the hour sleeve 30.

The ratios of the gears 59, 60, 63 and pinion 61 are so chosen that sleeve 30 makes one revolution in twelve hours. Secured to gear 63 is a smaller gear 64 meshing with a gear 65 twice the size of gear 64 so that the gear 65 is driven at the rate of one revolution in twenty-four hours. The gear 65 is journaled in a screw stud carried by frame 49.

The cam 53, gear 57, and gear 65 operate or control certain contacts the purpose of which will be explained more fully hereinafter. The plate 49 carries a stud 66 surrounded by a sleeve or bushing 67 (Fig. 14) of insulating material such as Bakelite. Pivoted on the sleeve 67 and properly spaced from each other by suitable insulating bushings are two pairs of cam followers 68, 69 and 70, 71. The cam followers 68, 69 are adapted to be operated by cam 53 and are held against the periphery of said cam by springs like 72 (Fig. 14) and have coacting contacts 73 which, when both followers are resting on the periphery of cam 53 as in Fig. 14, do not touch. The follower 69 is slightly shorter than follower 68 and will be the first to fall into the dwell of cam 53. When this happens the contacts 73 will quickly touch and close a circuit. A short time thereafter the follower 68 will fall into the dwell and the contacts 73 will quickly separate, thus breaking the circuit previously closed. Obviously the duration of closure of the circuit through contacts 73 will depend on the difference in length of followers 68, 69.

The followers 70, 71 are similarly provided with springs 72 and contacts 74 (Fig. 15) but are controlled by two diametrically opposite cam lugs 75 of insulating material secured to or integral with gear 57.

The operation of the followers 70, 71 is exactly the same as the operation of followers 68, 69. In order to prevent the followers 70, 71 from dropping too far a stud 76 is provided and is supported by the plate 48. Suitable insulating bushings 76a on an insulating sleeve 76b carried by stud 76 guide the free ends of followers 68 to 71, inclusive and prevent them from touching except in the desired way through contacts 73, 74.

Secured to the side of gear 65 are three contact plates 77 (Figs. 4, 11, and 13) which are insulated from gear 65 and are adapted to be wiped by a pair of fixed contacts 78 carried by the plate 49 and insulated from each other and plate 49. The plates 77 are so disposed that they bridge and thus electrically connect contacts 78 at 7 p. m., 8:30 p. m., and 4:30 a. m., respectively. Contacts 74 are closed for a short period once each half hour on the hour and half hour, while contacts 73 are closed momentarily once each minute, say for the period of the 60th second. Contacts 73, 74, 78 are all in series, consequently a circuit can be completed through all of them only during the 60th second of the 60th minute after 6 p. m. and the 60th second of the 30th minute after 8 p. m. and 4 a. m., respectively. At all other times, at least one set of these contacts will be open. The function of these contacts will be explained more in detail hereinafter.

The ratchet wheel 38 is provided with sixty teeth which are quite wide and face axially of the shaft 37 instead of radially. Coacting with the teeth of ratchet wheel 38 are two members 79, 80 both of which are adapted to be operated by the teeth of the ratchet wheel. The member 79 is pivoted at 81 to a cross bar 82 carried by the casing 20 and is formed like a pawl at its free end which engages the teeth of ratchet wheel 38.

The member 80 is pivoted at 83 to the member 79 and, like the latter is shaped like a pawl and similarly engages the teeth of ratchet 38. The member 79, however, projects slightly further to the right (Fig. 4) than the member 80 so that the latter tends to fall into each interdental space in the ratchet wheel 38 slightly in advance of the member 79 as the ratchet wheel rotates. The right-hand end of the member 80 has an upstanding arm carrying a weight 84 while the left-hand end of member 80 extends upwardly and to the left (Fig. 4) and has secured thereto a disk 85 of insulating material. The disk 85 underlies the lower member of a pair of spring contact members 86 insulated from each other and insulatably mounted on a bracket 86a secured to housing 20.

As ratchet wheel 38 rotates, the members 79, 80 will be raised in unison each time a tooth passes beneath the ends of said members. During this period suitable contacts carried by the free ends of members 86 will be separated, but the dropping of member 80 into an interdental space in advance of member 79 under the influence of weight 84 causes a relative clockwise rocking movement between members 79, 80 to close said contacts as in Fig. 4. When member 79 drops into the same interdental space a fraction of a second later, the members 79, 80 will again move relative to each other but in a counterclockwise direction to reopen the contacts. Thus, the contacts 86 are closed once each second as the ratchet wheel 38 revolves. If desired, a light spring may be substituted for the weight 84.

The mechanism described up to this point comprises the clock, including the time train and dial works, and the controlling means operated by the clock which serves to govern certain operations of the recording units hereinafter to be described in detail.

There are twelve recording units shown and identified in the drawings by the numerals 1 to 12 in squares (Fig. 1). Each recording unit has a slot 87 for the reception of a blank card like that of Fig. 2. As will be apparent from the following description, as many recording units may be provided as desired. Below each slot 87, and associated therewith, is a pair of keys 88, 89 whose key caps bear the letters "S" and "F" respectively, standing for "start" and "finish". Operation of these keys by depressing them individually initiates and terminates, respectively, the operation of the machine with respect to cards inserted in the associated slots.

Figure 3:
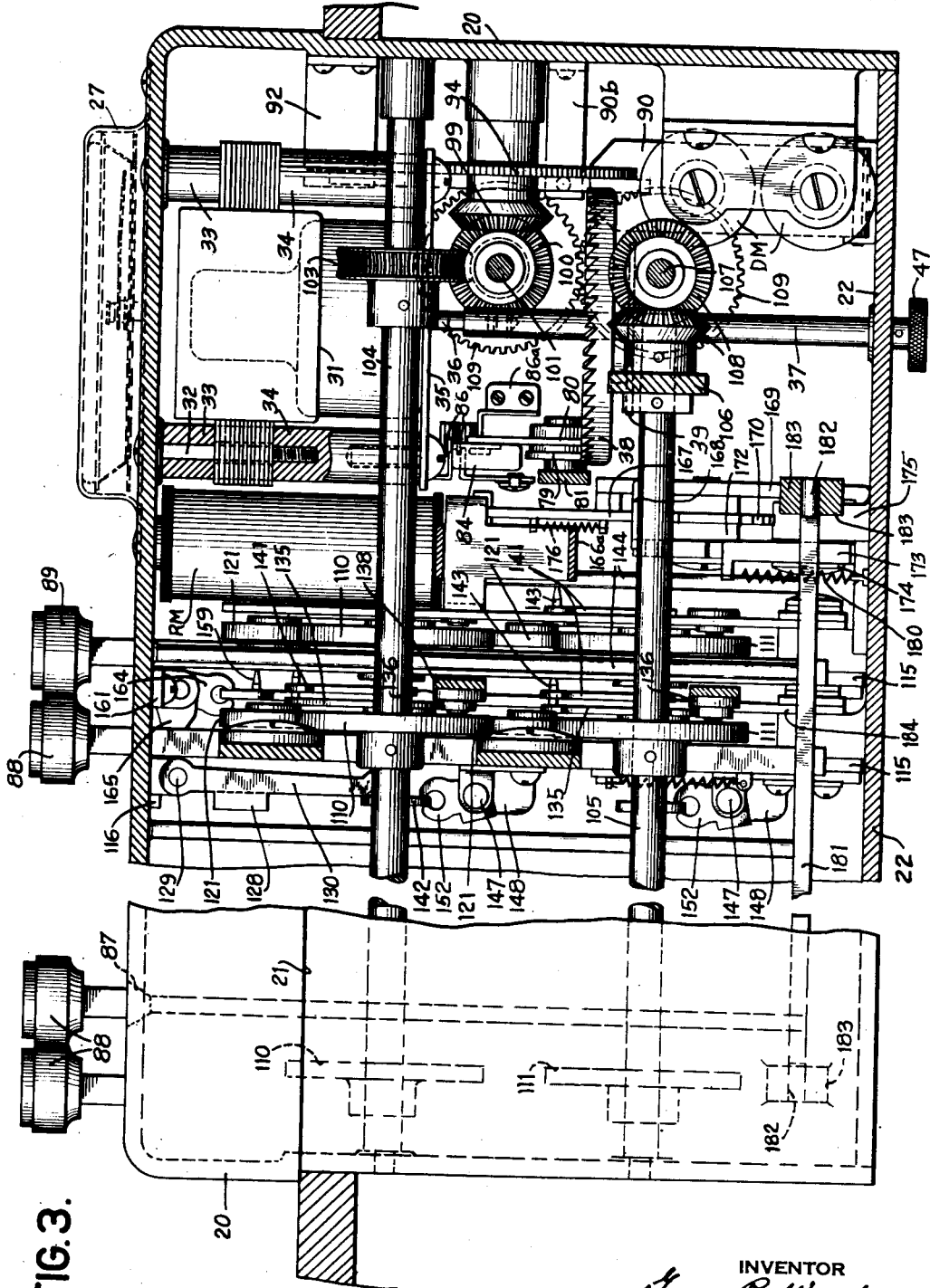
Fig. 3 is a vertical longitudinal section on the line 3—3 in Fig. 1.

Common to all the recording units are certain driving connections which are operated electrically under control of the contacts 73, 74, 78, and 86. The power for operating these driving connections is derived from two electromagnets DM and RM which, for convenience, may be termed the drive magnet and rate magnet, respectively. The relation of these magnets to the rest of the mechanism is best shown in Figs. 3, 4, 9, and 10. Referring to Figs. 3, 4, and 10, the drive magnet DM operates an armature 90 pivoted to the base 22 and having an extension to the upper end of which is pivoted a driving pawl 91. The free end of the pawl 91 rests in a closed slot in a bracket 92 secured to casing 20 which slot is somewhat longer than the width of the free end of pawl 91. The pawl 91 has a tooth 93 adapted to engage the teeth of a ratchet 94 having sixty teeth and journaled on a stud carried by housing 20.

The pawl 91 also has an irregular lug 95 having a cam portion 95a and a stop portion 95b, the cam portion cooperating with the upper edge of the slot in bracket 92. A spring 96, secured to a fixed pin and a pin carried by pawl 91 normally tends to hold the armature 90 and pawl 91 in the position of Fig. 4.

Drive magnet DM and contacts 86 are in series (Fig. 16) across line wires 97 leading to a low voltage battery 98 of sufficient capacity. Since contacts 86 are closed once each second and ratchet wheel 94 has sixty teeth, it is plain that drive magnet DM will be energized sixty times per minute and ratchet wheel 94 will be rotated constantly at the rate of one revolution per minute in response to the vibration of armature 90 and pawl 91. The purpose of cam surface 95a is to force the tooth 93 into the tooth space in ratchet 94 with which said tooth cooperates as pawl 91 moves to the right to the position of Fig. 10 where further movement of the pawl is prevented by the stop portion 95a. In this position of the parts the cam surface 95a cooperates with lug 92 to prevent the pawl 91 from rising and thereby effectually prevents overthrow of the ratchet wheel 94. The cam surface 95a in lug 95 is approximately parallel with the longer face of the tooth in the ratchet to the left of the shorter face engaged by tooth 93 (Fig. 10) so as to permit the pawl 91 to return to the normal position of Fig.

4 without binding. This construction permits the use of a light spring 96 as the cam surface 95a holds the tooth 93 in engagement with the teeth of the ratchet during most of the rightward stroke of pawl 91. The stop portion 95b positively limits movement of the ratchet wheel 94 to the angular distance between two teeth.

A pawl 97 cooperating with the teeth of ratchet 94 and operated by a spring 98 prevents reverse movement of the ratchet wheel 94. An adjustable stop 90a, carried by a bracket 90b fixed to casing 20, limits the movement of armature 90 in a counterclockwise direction.

Secured to the side of ratchet 94 is a bevel gear 99 which meshes with a similar bevel gear 100 secured to a transverse shaft 101. This shaft is journaled in the longer sides of casing 20 and carries two identical worms 102 driving worm wheels 103 on longitudinal shafts 104 journaled in the shorter sides of casing 20. The shafts 104 extend longitudinally of the machine and each is common to one of the two rows of recording units. Thus, the left hand shaft (Fig. 4) is associated with the six recording units generally identified by the numbers 1 to 6 in squares and etched or otherwise applied to casing 20 (Fig. 1), while the right hand shaft 104 is associated with recording units identified by the numbers 7 to 12. The ratios of the drive gears just described are so chosen that each shaft 104 makes one revolution in thirty minutes in the directions of the arrows on worm wheels 103 (Fig. 4).

Immediately below and parallel with shafts 104 are similar shafts 105 journaled in the front or left-hand end of the casing 20 (Figs. 1 and 3) and in brackets 106 carried by the longer sides of casing 20 (Figs. 3 and 4). These shafts 105 are driven in unison by a cross shaft 107, similar to shaft 101, through two pairs of bevel gears 108. The cross shaft 107 is driven by shaft 101 through spur gears 109. The ratios of the gears 99, 100, 108, and 109 are all unity so that shafts 105 are rotated by ratchet wheel 94 at the rate of one revolution per minute in the direction of the arrows on gears 108 (Fig. 4).

Mounted on the shafts 104, 105 are a number of friction disks 110, 111 respectively (Figs. 3, 5, and 8), there being a pair of disks 110, 111 for each of the recording units.

A complete recording unit with its parts shown in normal position is illustrated in front elevation in the right-hand half of Fig. 5, in section in Figs. 6 and 7, and in rear elevation in Fig. 8. The stem of each key of a pair 88, 89 is guided in its vertical movements by suitable openings in the top face of the casing 20 and in bent-over lugs 112 in a frame piece 113 secured by screws to a lug 114 integral with base plate 22. The screws which secure frame piece 113 to lug 114 also secure a vertical frame plate 115 to said lug. The frame plate 115 is quite narrow and extends upwardly between the keys 88, 89 and is in the same plane as said keys. The plate 115 is secured at its upper end by virtue of its being inserted in one or more slots formed in a bracket 116 secured to the underside of the top face of casing 20.

Secured to the plate 115 opposite the driving disks 110, 111 (Fig. 7) are two members 117, 118 which in form are flanged bushings passing through suitable holes in plate 115. Rotatably mounted on the bushing portions of members 117, 118 are friction disks 119, 120, respectively, which are in the same plane as disks 110, 111. Disk 119 is associated with disk 110 while disk 120 is associated with disk 111. The disks 119, 120 do not normally engage or touch their associated disks 110, 111 but are adapted to be driven by the latter through idler friction disks 121 carried by arms 122 pivotally mounted on lugs 123 integral with casing 20.

The free ends of arms 122 adjacent friction disks 121 rest in notches 124 in the stem of the key 88 and are linked to said key stems by means of springs 125 which hold said arms in engagement with the lower ends of said notches 125 when the key 88 is in normal position as in the right-hand half of Fig. 5 and in Fig. 6. A spring 126 secured to the stem of each key 88 and to a lug 127 mounted on plate 115, normally holds each key 88 in normal position and is more than sufficient to overcome the weight of disks 121 and arms 122. When any key 88 is depressed, as in the left-hand half of Fig. 5 and in Fig. 8, the associated arms 122 are permitted to drop assisted by the tensioning of springs 125 until rollers 121 rest on the peripheries of disks 110, 119 and 111, 120, respectively, the springs 125 producing sufficient pressure to cause disks 119, 120 to be driven frictionally by disks 110, 111 as in Fig. 8. The disk 119 will rotate at the rate of one revolution in thirty minutes while disk 120 will be driven at the rate of one revolution per minute.

In order to hold a depressed key 88 of any recording unit in depressed position for an indeterminate period, there is provided for each recording unit a bail 128 (Figs. 5, 6, and 7) carried by a short shaft 129 journaled in the bracket 116. This bail has a pawl-shaped latch arm 130 adapted to engage a notch 131 in the stem of key 88 when the latter is depressed and thereby hold the key 88 in the depressed position of Fig. 8. The latch arm 130 is moved in a counterclockwise direction (Fig. 6) to engage notch 131 by means of a torsion spring 132 on shaft 129 and connected to a pin carried by said shaft and to bracket 116 as shown in Figs. 5 and 7.

Bail 128 also has an arm 133 similar to arm 130 and adapted, when arm 130 moves into notch 131, to enter a notch 134 in the stem of the associated key 89. When any key 88 is latched down by its associated arm 130 the free end of arm 133 will be moved by spring 132 into notch 134. Subsequent depression of the adjacent key 89 will cause notch 134 to move downwardly (Figs. 5 and 7) with the result that arms 130 and 133 will be cammed away from the stems of keys 88, 89, releasing the key 88, whereupon spring 126 will restore the depressed key 88 and arms 122 to the position shown in the right-hand half of Fig. 5. Thus, key 88 effects connection of friction disks 119, 120 to the friction disks 110, 111 while key 89 effects disengagement of said disks and at the same time releases key 88.

Secured to the friction disks 119, 120 of each recording unit are restoring cams 135 which have associated therewith cam followers 136 provided with anti-friction rollers resting on the periphery of the cams. The cam followers 136 are pivoted at 137 to lugs 138 integral with the casing 20 and are held in cooperative relation with their cams by means of torsion springs 139. The cams 135 are substantially heart-shaped and normally the anti-friction rollers on arms 136 rest in the notches in the peripheries of the cams, as in Fig. 5. The profile of the cams 135 is so designed that, regardless of the amount or direction of rotation imparted to any of the cams 135 from the normal positions of Fig. 5, the cam follower of each cam tends to restore said cam to the position of Fig. 5.

Slidably mounted in the members 117, 118

(Fig. 7) are short shafts 140 (Fig. 7) to which are secured pricker arms 141 and flanged members 142. Secured to the free ends of the arm 141 are pricker pins 143 which also loosely project through holes adjacent the points in the cams 135 so that the arms 141 are positively driven by cams 135 and disks 119, 120 but are free to slide axially of the members 117, 118. Beneath the card slot 87 of each recording unit is mounted a sheet metal card pocket 144 closed at the bottom and having holes 145 which confront the pricker pins 143 and are of slightly larger radii than the radius of the arc of movement of said pricker pins 143. It is obvious that movement of the two shafts 140 of each recording unit to the right (Fig. 7) will cause their associated pricker pins 143 to puncture a card which happens to be in the adjacent pocket 144. The points at which the punctures will be made will depend on the amount of displacement of the arms 141 and pins 143 from normal position imparted by friction disks 110, 111.

Movement of the shafts 140 of any recording unit to cause puncturing of the card is produced by depressing the key 89 of such unit against the tension of a spring 146 which holds said key in its normal vertical position as in Figs. 5 and 7. Pivoted on pins 147 carried by brackets 148 secured to the frame plate 115 of each recording unit, are two bails 149. One arm 150 of each bail projects into a notch or slot 151 (Figs. 5 and 8) in the stem of the associated key 89 while the other arm 152 of each bail is formed with opposed jaws loosely receiving the flange of a member 142. It is plain that depression of the key 89 of any recording unit will result in both bails 148 of such unit being rocked clockwise (Fig. 7) by arms 150 to move shafts 140 toward the card in the associated slot and will thus cause both the pricker pins 143 to puncture said card.

Figure 2 shows a form of record sheet adapted to be used with the recorder herein described. The upper part of the sheet has blanks for filling in the subscriber's number, the station called, date, and so on. Below these blanks is the word "rate" beneath which appear three squares or boxes 153 identified by the letters "D", signifying "day", "E", signifying "evening", and "N", denoting "night"; appearing immediately above said boxes. A hole 154 may be punched in one of these boxes according to the time of day at which a telephone toll call is made, in order to indicate to clerks whether the day, evening, or night rate is to be used in ascertaining the charge to be made for the call. Below the three boxes 153 just mentioned appear two circular rows of figures and graduations corresponding to the successive positions assumed by the two pricker pins associated with a recording unit after said card has been placed in the pocket of such unit and the key 88 depressed. The perforations 155, 156 made in the sheet of Fig. 2 indicate that a call represented by the sheet required five minutes and fifty-two seconds of line time for the subscriber to complete.

The hole 154 in the "D" box 153 indicates that the call was begun when the day rate was in effect. This hole is made, when the starting key 88 is depressed to set in motion the prickers 143 for subsequently making the holes 155, 156, by mechanism actuated by the key 88. Supported by a screw stud 157 carried by the lug 114, to which is secured the frame plate 115 of each recording unit, is a somewhat U-shaped lever 158 whose upper end carries a pricker pin 159 adapted to be projected through oval holes 160 in the adjacent pocket 144. This movement of the pricker 159 through a record sheet in such pocket will puncture the sheet in one of the three boxes 153 according to the position of the lever 158.

Mounted beneath each pair of keys 88, 89 and secured to the casing 20 is a pair of brackets 161 (Figs. 5 to 8) supporting a pin 162 on which is pivotally mounted a bail 163. One arm 164 of each bail 163 has two opposed jaws embracing the sides of lever 158 while the other arm 165 of said bail lies in a slot 166 in the stem of key 88. It is plain that depression of any key 88 will rock bail 163 counterclockwise (Figs. 6 and 7) and, through arm 164, force the pricker 159 into the record sheet in the associated pocket 144.

The levers 158 of all the recording units are selectively set periodically as different rates take effect. The most usual schedule of rates for telephone toll calls has the day rates effective from 4:30 a. m. to 7 p. m., the evening rates effective from 7 p. m. to 8:30 p. m. and the night rates from 8:30 p. m. to 4:30 a. m. In order to selectively control the position of lever 158 and pricker 159 of each recording unit, certain rate control mechanism is provided which is operated periodically by rate magnet RM under control of the contacts 73, 74, 78 previously described herein. This mechanism is shown in Figs. 3, 4, and 9.

The magnet RM actuates an armature 166 pivoted on a bracket 166a secured to casing 20 on an extension of which armature is pivoted a pawl 167, quite similar to pawl 91, and whose free end is guided by a slot in a lug 168 forming part of a bracket 169 secured to base plate 22. The pawl 167 is adapted to operate a ratchet wheel 170 journaled on a stud 171 carried by the bracket 169. The ratchet wheel 170 has twenty-four teeth and secured to it is a multi-lobed cam 172 having eight lobes, or one lobe for three successive teeth on ratchet wheel 170.

The lobes of cam 172 are all alike and are so shaped that there is a high point, a low point, and an intermediate point, each point corresponding to one of the three teeth on ratchet wheel 170 associated with a lobe. Thus, three successive steps of movement of the ratchet wheel will cause a cam follower lever 173, pivoted at 174, to a lug 175 formed in base plate 22, to rock successively to three different positions. The pawl 167 has attached thereto a spring 176 which tends to draw said pawl and the armature 166 downwardly (Figs. 4 and 9). A non-return pawl 177, also operated by spring 176 and pivoted on bracket 169, prevents reverse movement of ratchet wheel 170.

The cam follower lever 173, besides having a lug 178 normally resting on the periphery of cam 172, has a bent over lug 179 on an extension of said lever, to which lug is attached a spring 180 secured to a lug in base plate 22. This spring 180 keeps lug 178 in contact with the periphery of cam 172 so that the lever 173 responds to every movement of the lobes in the cam. Both ends of lever 173 have opposed jaws embracing the edge of flat strips 181, pivoted along one edge, as at 182, to lugs 183 formed in casing 20. The left hand strip 181 (Fig. 5) is common to the left-hand row of recording units, while the right-hand strip 181 is common to the right-hand row of recording units. Each of the U-shaped levers 158 carrying the prickers 159 has a horizontal arm 184 having opposed jaws loosely embracing one of the strips 181. The arms 184 of the left-hand levers 158 (Fig. 5) associated with the left-hand row of recording units (Fig. 1) are connected, as described, to the left-hand strip 181 (Fig. 5), while the levers 158 of the right-hand row of recording units are connected to the right-hand strip 181.

The arms 184 are not rigidly secured to levers 158 but a yielding connection is provided to permit arms 184 to move independently of levers 158. Secured to each lever 158 is a short sleeve 185 which is journaled on stud 157 (see Fig. 17). A short arm 186 (Figs. 5 and 8) is secured to the left end of each sleeve 185 (Fig. 17) and extends parallel with arm 184 which is loosely mounted on sleeve 185 between arm 186 and lever 158. A light spring 187 yieldingly connects arm 186 with a bent over lug formed in arm 184. This construction permits arm 184 to move relative to lever 158 when the pricker pin 159 of said lever 158 has been projected into the card and locked in this position by the depression of the start key 89 and allows the strips 181 to vibrate freely in case the rate control mechanism operates while the time of a toll call is being measured. This condition is very apt to occur at 4:30 a. m., 7:00 p. m., and 8:30 p. m. when a toll call begins before and terminates after these stated times. The arms 184 and levers 158 of those recording units which are not in use will move together at the times stated above.

This construction has a two-fold purpose. First, to permit the rate control mechanism to operate with respect to inactive units when the prickers of active recording units have been projected through a card and locked. If the yielding connection were not provided and thick record sheets or cards were used, the pricker of a single active unit would prevent the rate control mechanism from being effective with respect to the inactive units when a change in rate occurs during the period of activity of the active unit. Second, when thin record sheets are used, to prevent tearing the sheets in pockets of active recording units by the operation of the rate control mechanism during the periods of activity of active units.

In Fig. 4, the lug 178 rests on the point of a cam lobe intermediate the high and low points of such lobe, so that lever 173, strips 181, and arms 184 are all horizontal. In this position of the parts, all the levers 158 are in their central positions and the depression of any key 88 will cause a puncture to be made in the center box 153 denoting the evening rate. If an additional step of movement is imparted to ratchet wheel 170 by magnet RM and pawl 167 causing the cam 172 to advance sufficiently to bring the high point of the lobe under lug 178, lever 173 will be moved to the position of Fig. 9. This movement causes the strips 181 to rock clockwise (Figs. 4, 5, and 9) and causes all the levers 158 (except those whose prickers are pushed into cards) to rock counterclockwise (Fig. 5) to bring the pricker pins 159 opposite the left-hand or day rate box 153 (Fig. 2). Another step of movement of cam 172 will cause the lug 178 to drop into the dwell between lobes with the result that the left-hand strip 181 (Fig. 5) will be raised above the horizontal position of said figure while the right-hand strip 181 will be depressed. The levers 158 will in such case be rocked clockwise to bring pricker pins 159 opposite the right-hand box 153 (Fig. 2) denoting the night rate.

These movements of cam 172 and levers 158 are successive throughout each day and are produced at predetermined times by the rate magnet RM under control of the contacts 73, 74, 78. These contacts are all closed only three times each twenty-four hours, that is, at 4:30 a. m., 7:00 p. m., and 8:30 p. m. This arrangement causes the pricker pins 159 to successively assume positions opposite the "D", "E", and "N" boxes 153 at 4:30 a. m., 7:00 p. m., and 8:30 p. m., respectively, in the order named.

The uses and mode of operation of the toll recorder will now be described briefly.

The recorder will be mounted on the switchboard in a position easily reached by the operator's hands. A stack of the record sheets of Fig. 2 will be provided and, for ease in writing on them, they may be assembled in pads. As a convenience to the operator in keeping track of the calls, which at times may approach or equal in number the capacity of the machine, the usual cord circuits may be numbered to correspond with the numbers in the squares in Fig. 1 identifying the recording units.

When a subscriber requests a connection with another subscriber over a toll line, the operator, while she is awaiting a response from the called subscriber, will note on the top sheet of the pad the numbers of the calling and called subscribers, tear off such sheet, and place it in the slot 87 of the pocket corresponding to the number of the cord circuit she has used to make the connection. As soon as the called subscriber answers, the operator will depress the key 88 associated with the slot 87 which has been selected to receive the card thereby coupling the friction disks 119, 120 of the selected recording unit to the corresponding friction disks 110, 111 to initiate operation of the selected recording unit and force its pricker pin 159 into the sheet. The latter will now be locked into the recorder and can be removed without tearing it only by depressing the finish key 89 of the selected recording unit. The pricker arms 141 of the selected recording unit will now commence to rotate under the influence of friction disks 110, 111.

Eventually the subscribers will finish their conversation and terminate the call. When this happens the operator will depress key 89 of the proper recording unit thereby forcing pricker pins 143 into the card at points dependent upon the length of the conversation between the subscribers. The sheet can now be removed and dropped into a basket or hopper ready to be taken to the accounting department for use in the computation, posting, and billing of the charges for the call. The dates can be pre-stamped with a rubber stamp or can be stamped at the end of each day when the cards are collected, this operation being done by a clerk, if desired.

It will be seen that little time, effort, and intelligence is required to operate the recorder and more time is made available for the operator to devote her attention to the switchboard. Obviously more calls can be supervised by the operator since she will have little work of a clerical nature to perform and the records of the calls will be kept more accurately owing to the simplicity of operation of the recorder.

Since ink or inking devices are not used in the recorder, no time is lost in re-inking the recorder or changing and adjusting inking devices such as ribbons or pads, cleaning the type faces of type wheels or bars usually used in recorders, and making minor repairs or adjustments sometimes arising from corrosion caused by the ink or excessive supplies of ink.

While there has been shown and described and pointed out the fundamental novel features of the

What is claimed is as follows:

1. A time recorder comprising a drive shaft having a constant speed, an elapsed time recording unit adapted to be driven by said drive shaft having a start key and a finish key, means operated by the start key for connecting the said unit to the drive shaft, means for retaining the start key in operated position, means operated by the finish key for releasing the retaining means, and means controlled by the finish key for operating the said recording unit to record the elapsed time on a record sheet individual to said unit.

2. An elapsed time unit comprising a pocket for receiving a record sheet, a start key and a finish key, a rotary marker adapted to mark a sheet in said pocket, a friction disk secured to said marker, a second friction disk driven at a constant speed, a friction idler operated by the start key for connecting said disks frictionally whereby the first disk is driven by the second, means operated by the start key for locking the record sheet in the pocket, means for holding the start key in operated position, means operated by the finish key for causing the marker to mark the record sheet, and means operated by the finish key for releasing the holding means.

3. In an elapsed time recorder having several elapsed time recording units the combination of card receptacles each receptacle being associated with a unit, rate recording mechanism automatically set at predetermined times to record rates in effect during different periods of time, said mechanism including a rate recording element associated with each unit and adapted when operated to record the rate and hold a card in its receptacle; keys for selectively operating said elements and initiating operation of the associated units; and other keys for selectively terminating operation of the units and releasing said elements.

4. An elapsed time unit comprising a rotary time pricker device; a card pocket in spaced relation to said pricker; a time drive; a rate pricker adjacent the time pricker device, a manual device operable to project said rate pricker through said card and connect the time pricker device to the time drive; means for locking the manual device in operated position; and a second manual device for projecting the rotary pricker through the card and releasing the locking means.

5. An elapsed time unit comprising a rate pricker; an elapsed time marker; a time drive element for the time marker; a pair of selectively operable devices for operating said markers, one for operating the rate marker and the other for operating the elapsed time marker; and connections between the selective devices and time drive element whereby operation of one of said selective devices first initiates operation of the elapsed time marker by said time drive element and then an operation of the other device terminates such operation.

6. In an elapsed time unit, a card pocket, a rockable rate marker variably settable and adapted to be projected against a card in said pocket, means for projecting said marker against said card, means for locking the marker in projected position to prevent removal of the card from the pocket, means for variably setting the rate marker at predetermined times, and a yielding connection between the rate marker and rocking means, to permit the latter to operate unrestrictedly at times when the rate marker is projected against the card.

7. In a telephone toll recorder, a plurality of card pockets, rockable rate recording elements adapted to be variably rocked to indicate different rates and each movable into contact with the card to record a rate, means automatically operative at predetermined times to variably rock all of said rate recording elements together to change the rate indicated by said elements, and yielding connections between said rocking means and the rate recording elements to permit said means to operate with respect to all said elements not in contact with cards.

8. An elapsed time unit comprising a pair of markers adapted to mark a record sheet, means for operating one of said markers to mark the record sheet and lock said sheet in marking position, a device for locking said means in operated position, and means for operating the other marker to mark the sheet and adapted to release the locking device.

9. In an elapsed time recorder comprising a series of elapsed time recording units, the combination of a time drive for operating said units, a series of selective devices each associated with one of said units, means operated by each of said devices for connecting the associated unit to said drive, a second series of selective devices each associated with a unit and the corresponding one of the first named selecting device, and means rendered effective upon an operation of one of the first named selective devices and releasable by the corresponding one of the second named devices for maintaining said units in driving relation to the drive whereby selective successive operation of one of the first series of devices and the corresponding one of the second series of devices first connects a selected one of said units to the drive and then disconnects the selected unit from the drive.

10. An elapsed time unit comprising a pocket adapted to receive a record sheet; an arm rotatable in a plane a spaced distance from a record sheet in said pocket and a stylus secured to said arm, said arm being movable toward the record sheet to project the stylus through the card; means for rotating said arm; a manual member with means to rotatably connect said arm to the rotating means; means for maintaining the driving connection thus established; and a second manual member with means to move the arm toward the record sheet to project the stylus through the sheet and adapted to release the maintaining means.

11. In an elapsed time recorder comprising a plurality of elapsed time units, the combination of a series of card receptacles each associated with a unit, keys selectively operable to initiate and other keys selectively operable to terminate operation of the units and effect recording of elapsed time on cards in said receptacles, and means selectively operated by the initiating keys for locking the cards in the receptacles while the units are in operation and selectively releasable by the terminating keys when operation of the units is to be terminated.

12. In an elapsed time recorder having a plurality of elapsed time recording units, the combination of a time drive for said units for operating the latter at a constant rate, a series of selective devices each operable to selectively connect a unit associated therewith to said drive, rate recording mechanism, and means responsive to an operation of any one of said selective devices to operate the rate recording mechanism each time one of said selecting devices is operated to connect a unit to said drive.

13. An elapsed time recorder comprising a card pocket, an elapsed time marking means so constructed and arranged as to be displaceable in a plane parallel with a card inserted in said pocket and also projectable toward the card to make a mark, a time drive for displacing the marking means parallel with the card in proportion to elapsed time, a pair of manually operable members, means controlled by one of said members for connecting the marking means to the time drive, and means controlled by the other of said members for projecting the marking means toward the card to mark the card and disconnect the marking means from the time drive.

14. In a telephone toll recorder, the combination with a series of elapsed time recording elements, each being associated with a receptacle for a record sheet individual to a single call; of elapsed time driving means associated with said elements and normally disconnected therefrom, selectively operable means for controlling the operation of said elements by the driving means, means operated by the selectively operable means for maintaining a driving relation between a selected recording element and the driving means, and means operated by the selectively operable means for causing an element connected to the driving means to record elapsed time on a record sheet in the associated receptacle and at the same time disable the maintaining means.

GEORGE R. WOOD.